(12) United States Patent
Engelken et al.

(10) Patent No.: US 9,493,103 B2
(45) Date of Patent: Nov. 15, 2016

(54) TRANSFORMING TRAILER SYSTEM AND METHOD

(71) Applicants: Alfred L. Engelken, Vermillion, KS (US); Jeremiah L. Engelken, Vermillion, KS (US)

(72) Inventors: Alfred L. Engelken, Vermillion, KS (US); Jeremiah L. Engelken, Vermillion, KS (US)

(*) Notice: Subject to any disclaimer, the term of this patent is extended or adjusted under 35 U.S.C. 154(b) by 0 days.

(21) Appl. No.: 14/711,522

(22) Filed: May 13, 2015

(65) Prior Publication Data

US 2015/0329160 A1     Nov. 19, 2015

Related U.S. Application Data

(60) Provisional application No. 61/992,721, filed on May 13, 2014.

(51) Int. Cl.
| | | |
|---|---|---|
| *B62D 63/06* | (2006.01) | |
| *B60P 1/43* | (2006.01) | |
| *B62D 63/08* | (2006.01) | |

(52) U.S. Cl.
CPC ............ *B60P 1/433* (2013.01); *B62D 63/061* (2013.01); *B62D 63/062* (2013.01); *B62D 63/08* (2013.01)

(58) Field of Classification Search
CPC ... B60P 1/433; B62D 63/061; B62D 63/062; B62D 63/08; B62D 63/06; B62D 63/068; B62D 53/061; B62D 53/062; B62D 33/0273
See application file for complete search history.

(56) References Cited

U.S. PATENT DOCUMENTS

| | | | | | |
|---|---|---|---|---|---|
| 2,753,064 | A | * | 7/1956 | Lesser | B60P 1/04 280/149.2 |
| 4,114,944 | A | * | 9/1978 | Joynt | B62D 33/0273 296/50 |
| 5,887,880 | A | * | 3/1999 | Mullican | B60G 3/14 280/124.116 |
| 6,135,700 | A | * | 10/2000 | Collins | B60P 3/07 280/43.23 |
| 6,394,734 | B1 | * | 5/2002 | Landoll | B60P 3/062 280/149.2 |
| 8,267,410 | B1 | * | 9/2012 | Stutz | B60G 5/00 280/43.23 |
| 9,387,789 | B2 | * | 7/2016 | Patterson | B60P 1/433 |
| 2009/0123260 | A1 | * | 5/2009 | Howard-Leicester | B60P 3/122 414/475 |

* cited by examiner

*Primary Examiner* — John Walters
*Assistant Examiner* — Brian Swenson
(74) *Attorney, Agent, or Firm* — Law Office of Mark Brown, LLC; Christopher M. DeBacker

(57) ABSTRACT

A single or double axle trailer including an axle assembly for moving the trailer axles forward or backwards along a track. As the axle assembly moves toward the front end of the trailer, the track leads into a drop cavity space which causes the trailer to drop closer to the ground. At the same time, a pair of carrier arms which hold up a dovetail platform hingedly connected to the rear of the trailer are pulled out from the dovetail, causing the platform to drop toward the ground. Once the carrier arms are pulled all of the way forward and the axles are in the drop cavity, vehicles may be driven up the dovetail platform like a ramp.

10 Claims, 24 Drawing Sheets

TRANSFORMING TRAILER SYSTEM AND METHOD

CROSS-REFERENCE TO RELATED APPLICATION

This application claims priority in U.S. Provisional Patent Application No. 61/992,721, filed May 13, 2014, which is incorporated herein by reference.

BACKGROUND OF THE INVENTION

1. Field of the Invention

The present invention relates generally to a transformable trailer, and more specifically to a trailer which can transform to provide a loading ramp portion for temporarily loading and unloading the trailer.

2. Description of the Related Art

In a typical situation where a vehicle is being loaded onto a transport trailer, the user will use a pair of ramps which are placed at the rear of the trailer. It can be difficult to align these ramps with the wheels of the vehicle being loaded to the trailer, and a mistake can cause the vehicle to roll off of the ramps and cause damage to the vehicle, the trailer, or the user.

Another disadvantage of these loading ramps is that they are heavy and cumbersome to set up. Further, these ramps have to be transported along with the trailer, which reduces useable space within the trailer or the vehicle towing the trailer.

What is needed is a simple transport trailer which can quickly and easily transform between a travel position and loading position while providing a safe and reliable ramp for loading vehicles onto the trailer.

Heretofore there has not been available a system or method for transforming a trailer for loading and unloading purposes with the advantages and features of the present invention.

SUMMARY OF THE INVENTION

The present invention generally provides a transforming trailer capable of transforming from a travel position to a loading position and back quickly and safely. The trailer generally includes a trailer deck for storing a vehicle during travel, and a loading assembly affixed to an end of the trailer deck. The loading assembly includes a slightly inclined portion of the trailer deck connected to a dovetail assembly by a pinned hinge. A carrier arm is received by a receiver slot on the dovetail assembly. The carrier arm is hydraulically powered and mounted to the underside of the trailer deck and to the rear axle of the trailer. The dovetail is raised and lowered as the carrier arm is moved.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. First Embodiment Single Axle Trailer System 2

Figure 1:
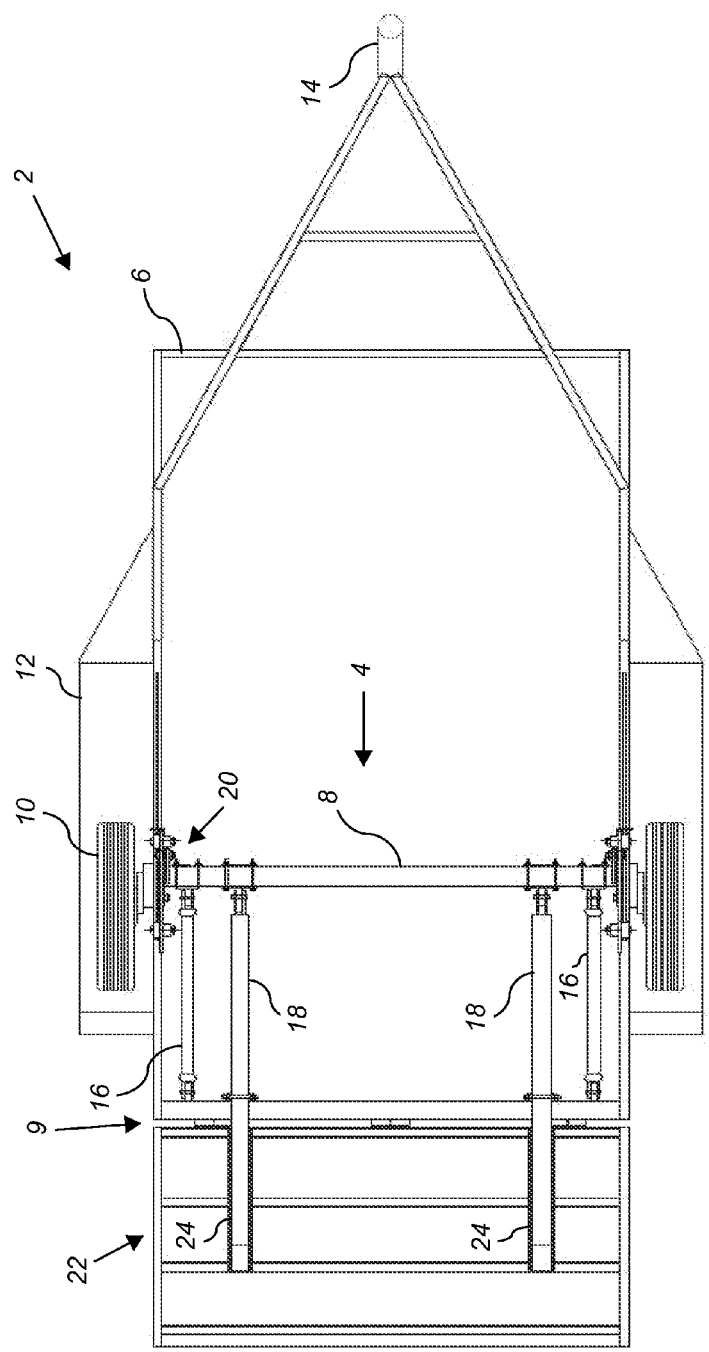
FIG. 1 is top plan view of a first embodiment of the present invention in a first, towing position.
Figure 2:
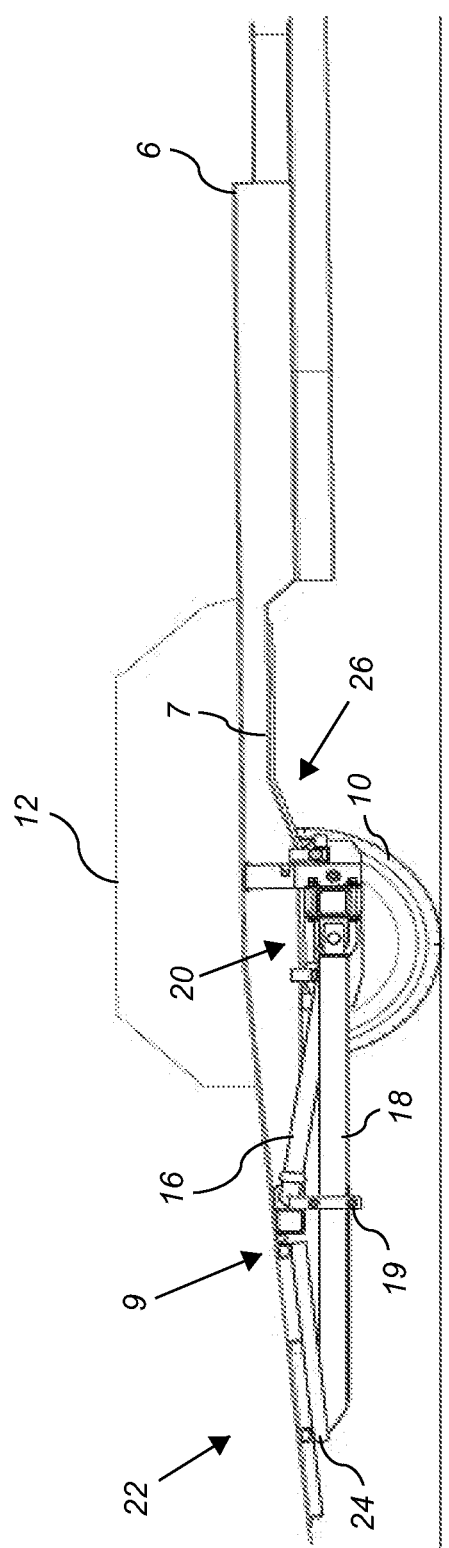
FIG. 2 is a side elevational view thereof.
Figure 3:
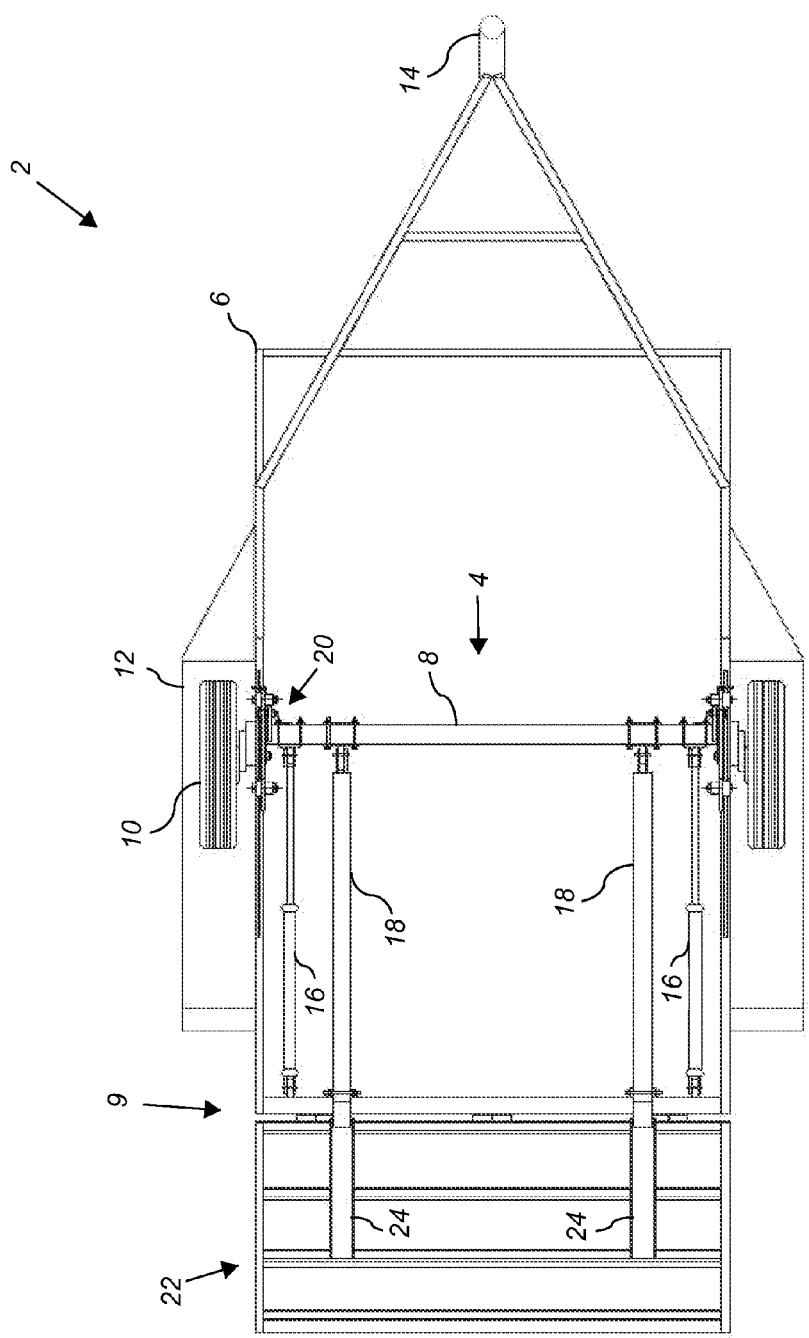
FIG. 3 is a top plan view the first embodiment of the present invention in a second, loading position.
Figure 4:
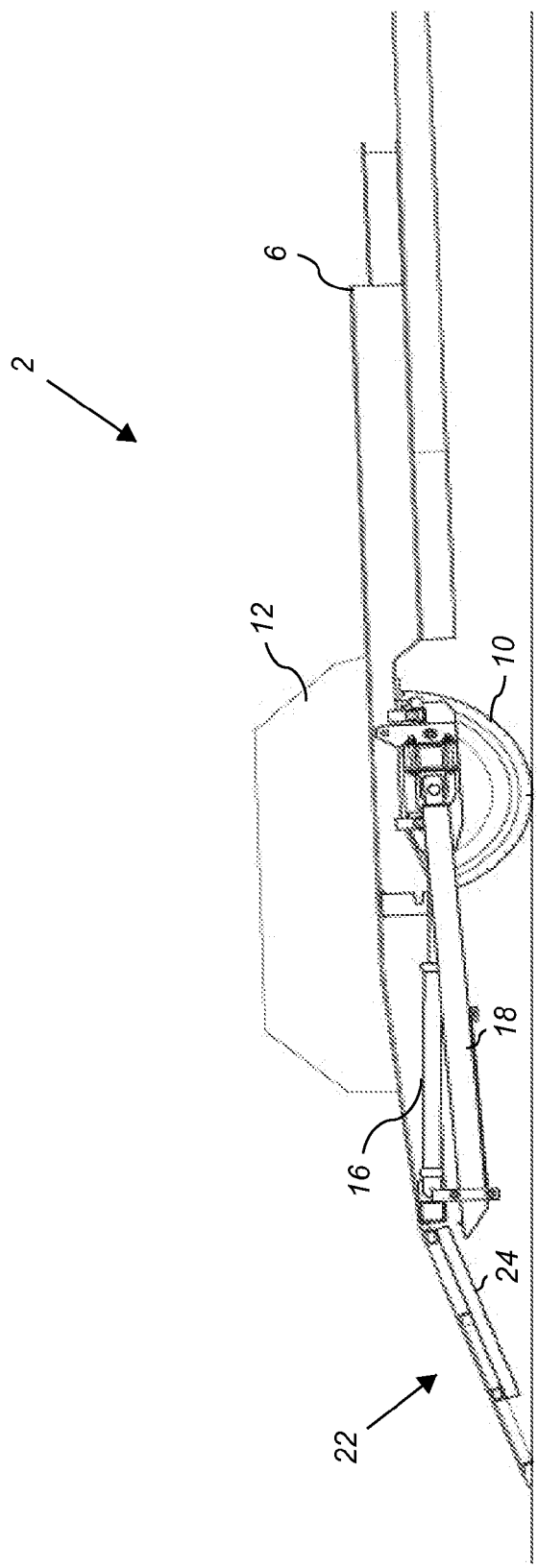
FIG. 4 is a side elevational view thereof.
Figure 5:
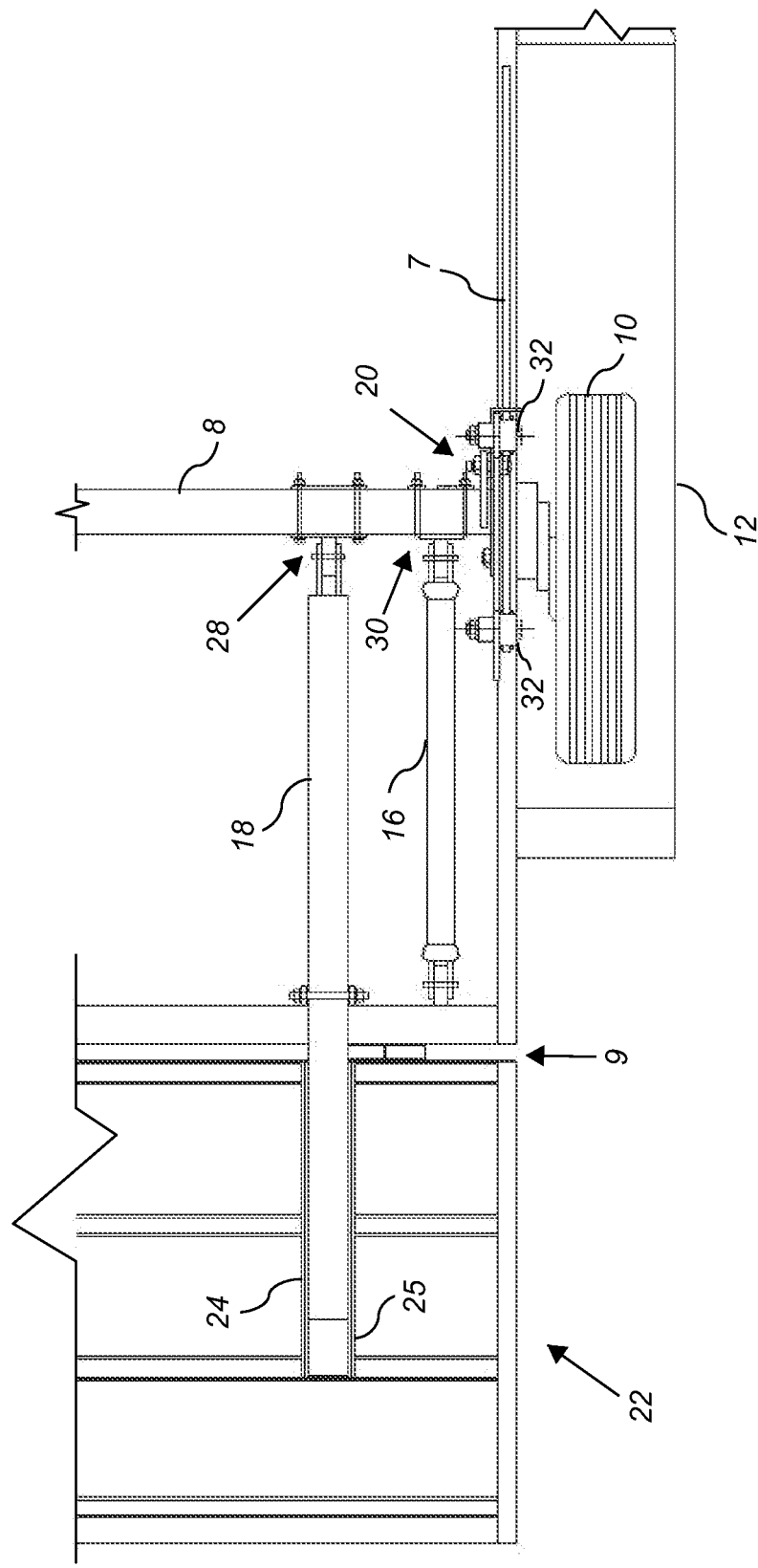
FIG. 5 is a partial bottom plan view of the first embodiment of the present invention in a first, towing position.
Figure 6:
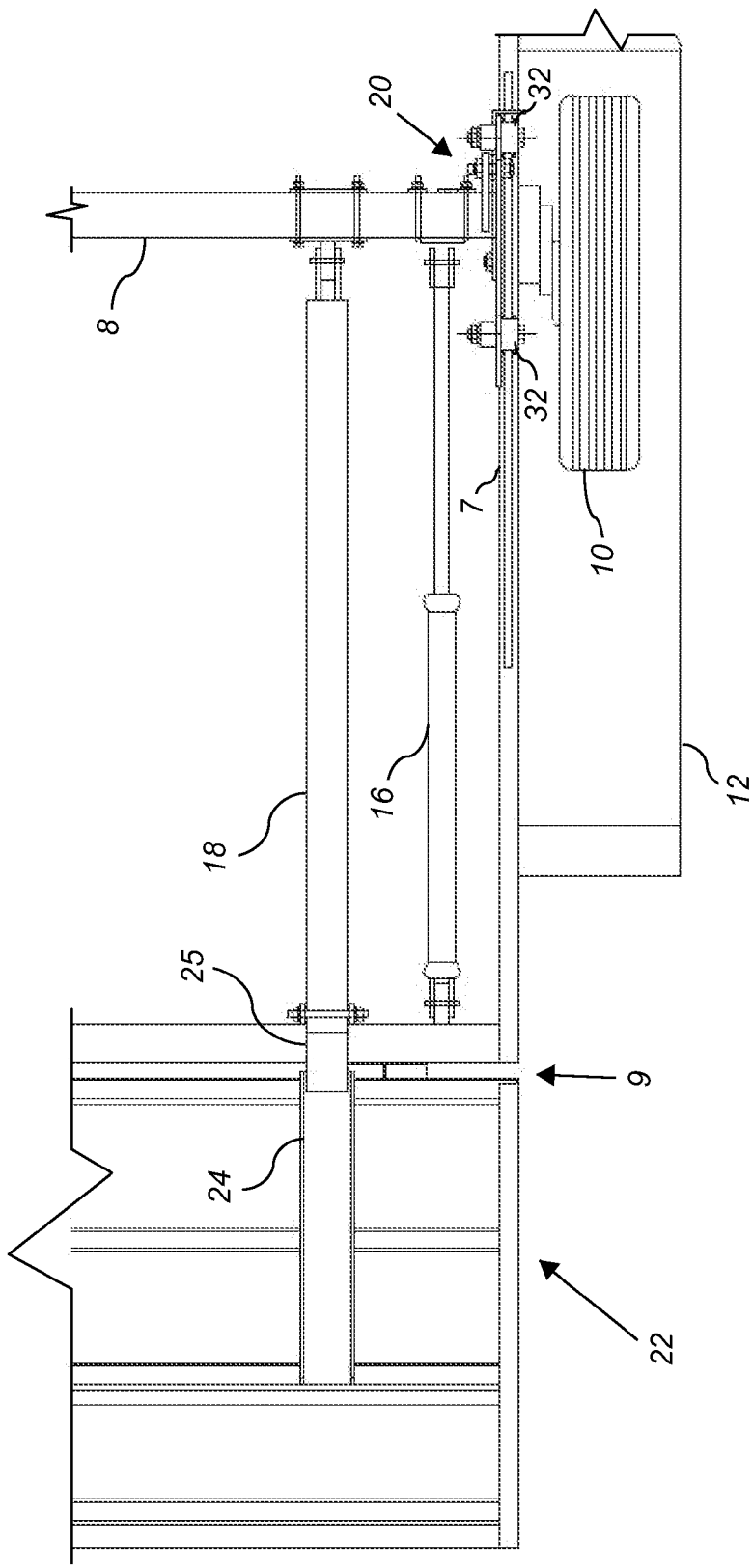
FIG. 6 is a partial bottom plan view of the first embodiment of the present invention in a second, loading position.
Figure 7:
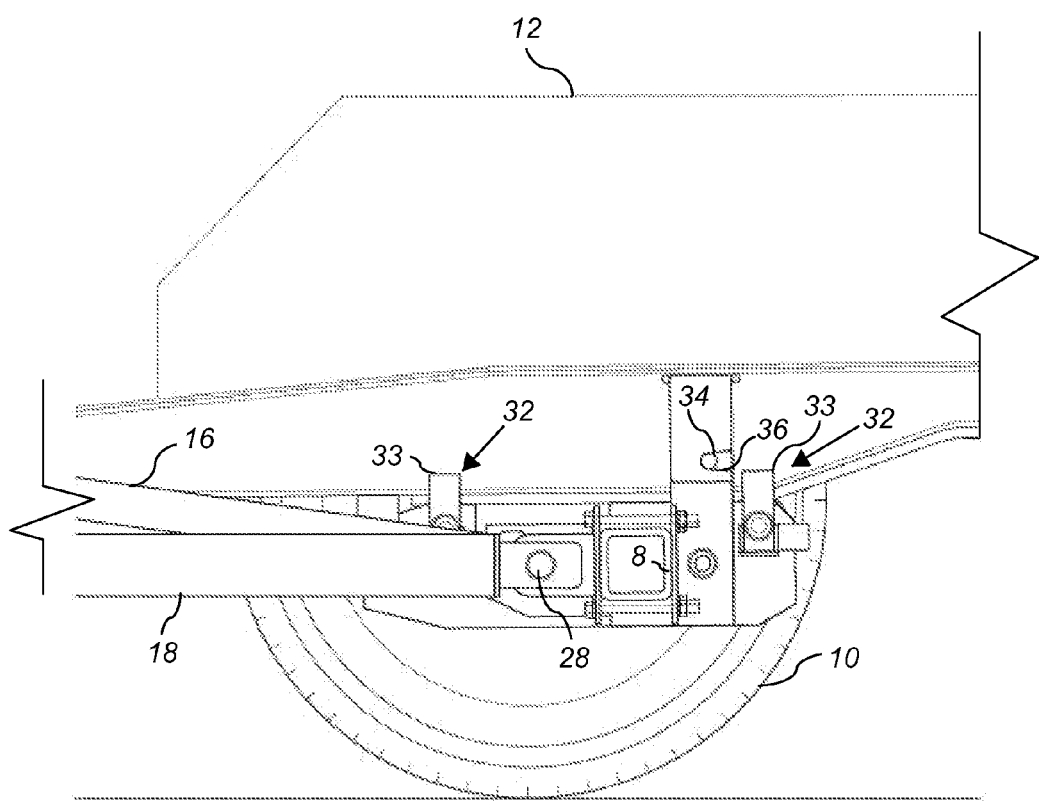
FIG. 7 is a detailed plan view of the first embodiment of the present invention in a first, towing position.
Figure 8:
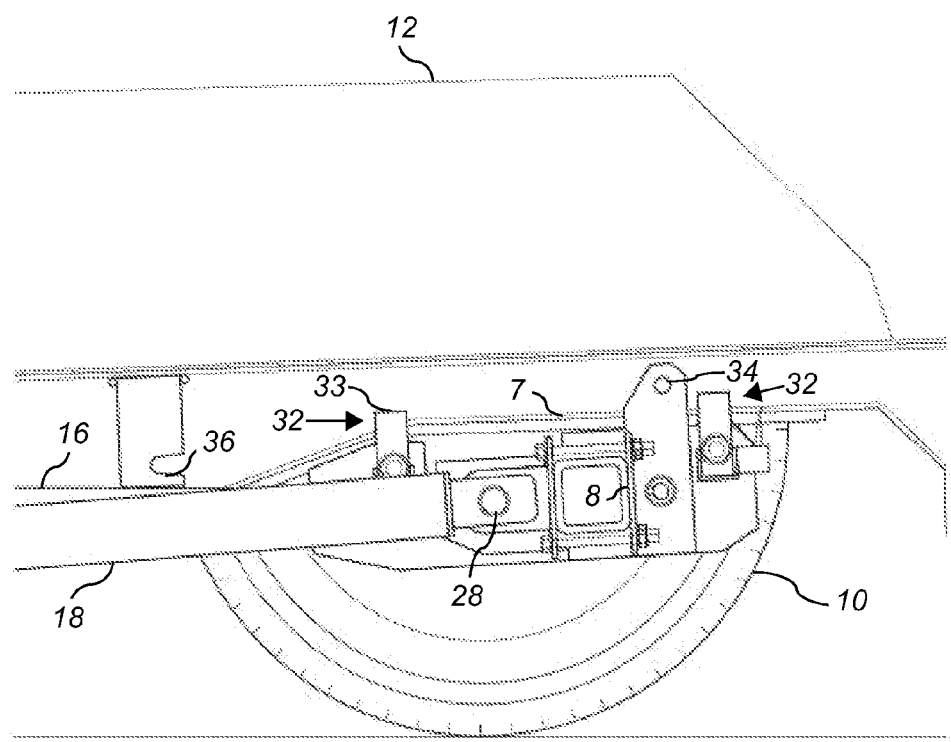
FIG. 8 is a detailed plan view of the first embodiment of the present invention in a second, loading position.

FIGS. 1-8 demonstrate a first embodiment of the present invention. As shown in FIG. 1, the present invention is a single axle trailer system 2 designed for the transport of vehicles or other items. FIG. 1 shows the present invention in a first, transport position. When loading or unloading items or vehicles onto the trailer 2, the trailer is transformed into a second, loading position as shown in FIGS. 3-4. The trailer 2 primarily includes a structural frame 6 and a hitch 14 for connecting to a towing vehicle.

A dovetail loading assembly 22 is connected to the rear end of the trailer deck by a hinge as shown in FIGS. 1-4. This dovetail assembly 22 acts as a ramp when the trailer is in the loading position. When in the travel position, the dovetail assembly 22 is held in place by a carrier arm 18 which slides into a slotted receiver 27 on the bottom of the dovetail. The carrier arm holds the dovetail assembly up in a cantilevered fashion in the transport position. The strength of the carrier arm is enough to hold up a portion of a vehicle or other item which is placed directly on the dovetail.

The carrier arm 18 is mounted to the undercarriage of the trailer and is powered by a hydraulic arm 16. When the trailer transforms from the travel position to the loading position, the entire rear axle 8 trolley assembly 4, including the mounted end of the carrier arm 28, moves towards the front of the trailer. The axle 8 trolley assembly 4 follows a track 7 which moves the assembly towards the front of the trailer but also upwards into a drop cavity 26, causing the rear end of the trailer to drop during the process. This accelerates the transformation from a transport position to a loading position while decreasing the slope of the dovetail ramp when deployed. The wheels 10 generally roll beneath the fenders 12 in the space allotted by the wheel wells.

As shown in FIG. 1, in a preferred embodiment there is a break 11 in the deck slope near the rear end of the trailer deck. This is also to aid in the loading process by providing a better slope for tires to travel up. As shown in FIG. 2, the free end of the carrier arm 18 includes a slanted edge on its end 25 which slots into a catch, such as element 127 shown in FIG. 10, within the slotted receiver 24 of the dovetail assembly 22 for a more secure connection. The catch is mounted to the underside of the trailer deck which catches the axle trolley assembly when the trailer is placed into a transport position. This catch locks the trolley assembly in place and prevents the axle from moving during transport.

The axle trolley assembly 4 includes a bracket 20 which connects to the wheel axle. The trolley assembly also includes a guide clip 33 for guiding the assembly along the track when the assembly is in motion. The guide clip 33 may also act as a backup safety element if the rollers 32 come off of the track 7. A flex-tie or other connection element permits axle rotation of the wheel axle with approximately the same center line elevation as a typical wheel axle. The rollers 32 in a preferred embodiment could be constructed from a wire rope roller sheave or other suitable rolling element.

FIGS. 2 and 4 show the trailer in a second, loading position, and show how the dovetail assembly drops, along with the back end of the trailer, as the axle trolley assembly 4 moves toward the front of the trailer and as the carrier arm 18 is drawn away from the dovetail assembly 22. A hanger plate 19 holds the free end of the carrier arm 18 up as it is pulled away from the dovetail assembly.

The hydraulic cylinder assembly 16 moves the entire axle assembly forward and backward. The wheel 10 is offset from the axle via a wheel assembly including the flex-tie axle connector, as shown in more detail in FIGS. 7 and 8 and also in FIGS. 1 and 2. The offset allows the wheel to continue unhindered as the axle assembly 4 moves along the track 7 and into the drop cavity 26, thereby dropping the deck of the trailer 2.

The carrier arm 18 is connected to the axle 8 by a carrier arm mounting assembly 28, and the hydraulic arm 16 is connected to the axle 8 by a similar hydraulic arm mounting assembly 30. These mounting assemblies allow the ends of both the carrier arm 18 and hydraulic arm 16 to pivot as the axle assembly 4 travels along the track 7 and enters the drop cavity 26 of the trailer. Without this pivoting action, the arms may bind, and the carrier arm 18 would not remain parallel with the road, and could cause the dovetail 22 to jerk upwards or downwards uncontrollably.

A pair of locking mechanisms including a receiver 36 are to the frame 6 in proximity with the end of the tracks 7, which receivers 36 receive the locking pins 34 which prevent the assembly 4 from moving backwards toward the dovetail 22 further than the starting position. These locking pins 34 and receivers 36 also keep the axle assembly in place during transport of the trailer 2, preventing the structure from falling.

III. Second Embodiment Single Axle Trailer System 102

FIGS. 9-16 show a second embodiment of a single axle trailer system 102. Many of the features are similar to the first embodiment trailer system 2 disclosed above. Here, however, a removable fender 112 travels along with the axle assembly 104, removably connected to a tube 138 welded to the bracket 120 or other element of the axle assembly 104. The fender 112 is mounted to the tube 138 via butterfly nuts or other simple connection elements (e.g. snaps, screws, etc.) which allow the fender to quickly be disconnected from the trailer system 102, expanding the width of the trailer to accommodate larger vehicles.

Like above, the trailer 102 primarily includes a structural frame 106 and a hitch 114 for connecting to a towing vehicle.

A dovetail loading assembly 122 is connected to the rear end of the trailer deck by a hinge as shown in FIGS. 9-12. This dovetail assembly 122 acts as a ramp when the trailer is in the loading position. When in the travel position, the dovetail assembly 122 is held in place by a carrier arm 118 which slides into a slotted receiver 127 on the bottom of the dovetail. The carrier arm holds the dovetail assembly up in a cantilevered fashion in the transport position. The strength of the carrier arm is enough to hold up a portion of a vehicle or other item which is placed directly on the dovetail.

The carrier arm 118 is mounted to the undercarriage of the trailer and is powered by a hydraulic arm 116. When the trailer transforms from the travel position to the loading position, the entire rear axle 108 trolley assembly 104, including the mounted end of the carrier arm 128, moves towards the front of the trailer. The axle 108 trolley assembly 104 follows a track 107 which moves the assembly towards the front of the trailer but also upwards into a drop cavity 126, causing the rear end of the trailer to drop during the process. This accelerates the transformation from a transport position to a loading position while decreasing the slope of the dovetail ramp when deployed.

Figure 9:
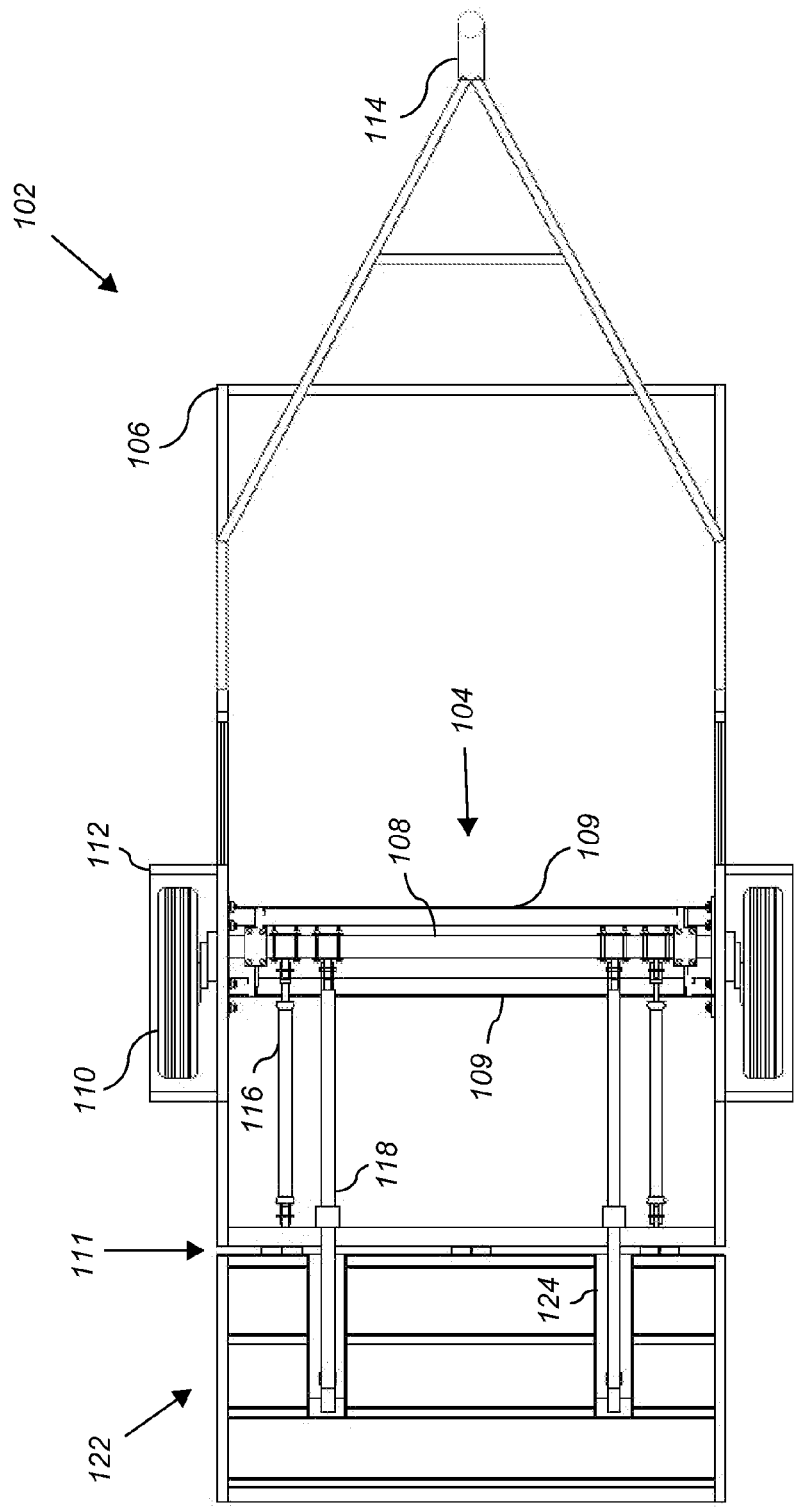
FIG. 9 is top plan view of a second embodiment of the present invention in a first, towing position.
Figure 10:
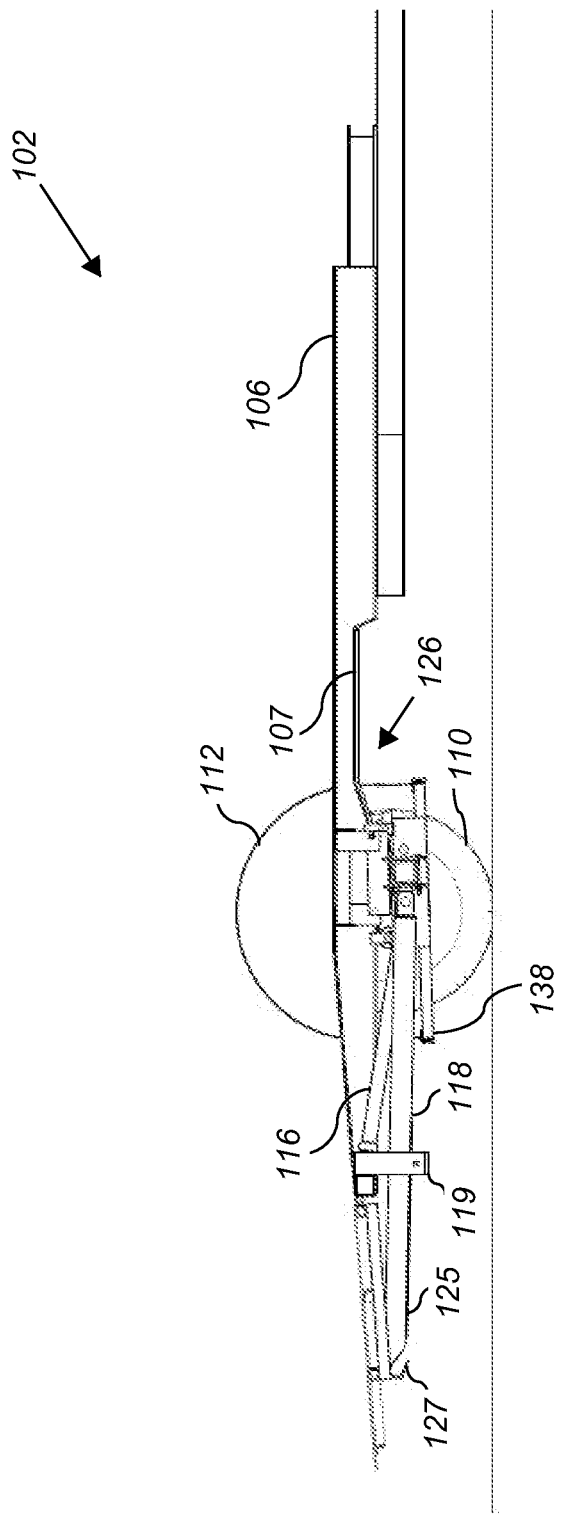
FIG. 10 is a side elevational view thereof.

As shown in FIG. 9, in a preferred embodiment there is a break 111 in the deck slope near the rear end of the trailer deck. This is also to aid in the loading process by providing a better slope for tires to travel up. As shown in FIG. 10, the free end of the carrier arm 118 includes a slanted edge on its end 125 which slots into a catch 127 shown in FIG. 10, within the slotted receiver 124 of the dovetail assembly 122 for a more secure connection. The catch is mounted to the underside of the trailer deck which catches the axle trolley assembly when the trailer is placed into a transport position.

This catch locks the trolley assembly in place and prevents the axle from moving during transport.

The axle trolley assembly 104 includes a bracket 120 which connects to the wheel axle. The trolley assembly also includes a guide clip 133 for guiding the assembly along the track when the assembly is in motion. The guide clip 133 may also act as a backup safety element if the rollers 132 come off of the track 107. A flex-tie or other connection element permits axle rotation of the wheel axle with approximately the same center line elevation as a typical wheel axle.

Figure 12:
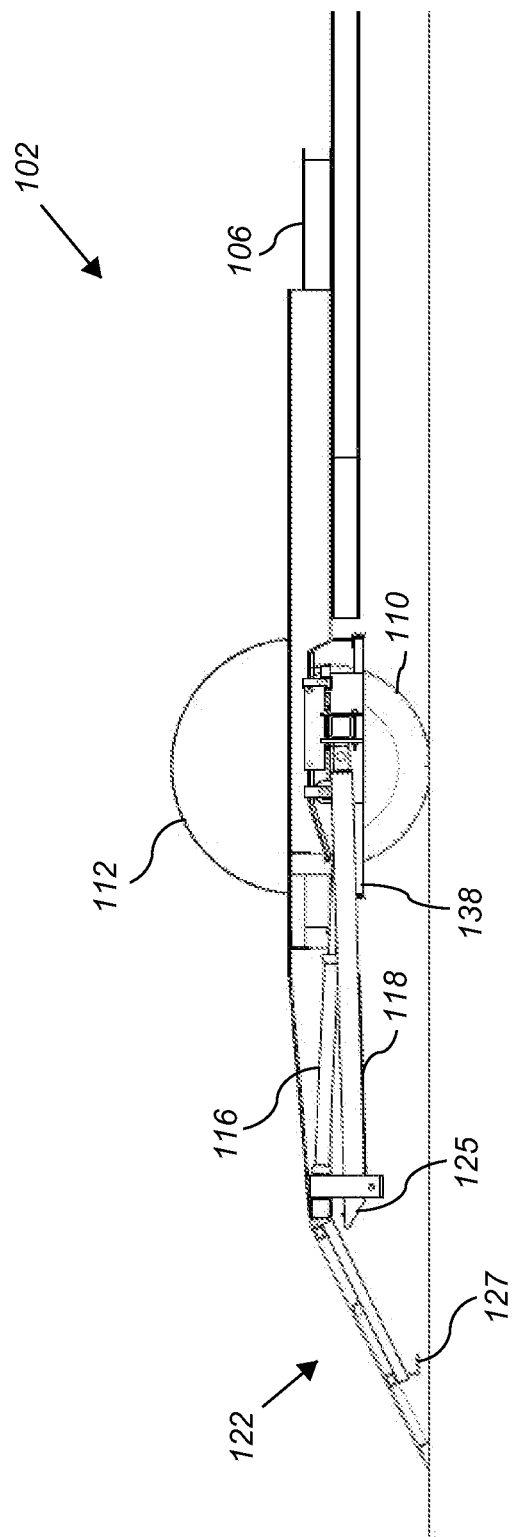
FIG. 12 is a side elevational view thereof.
Figure 13:
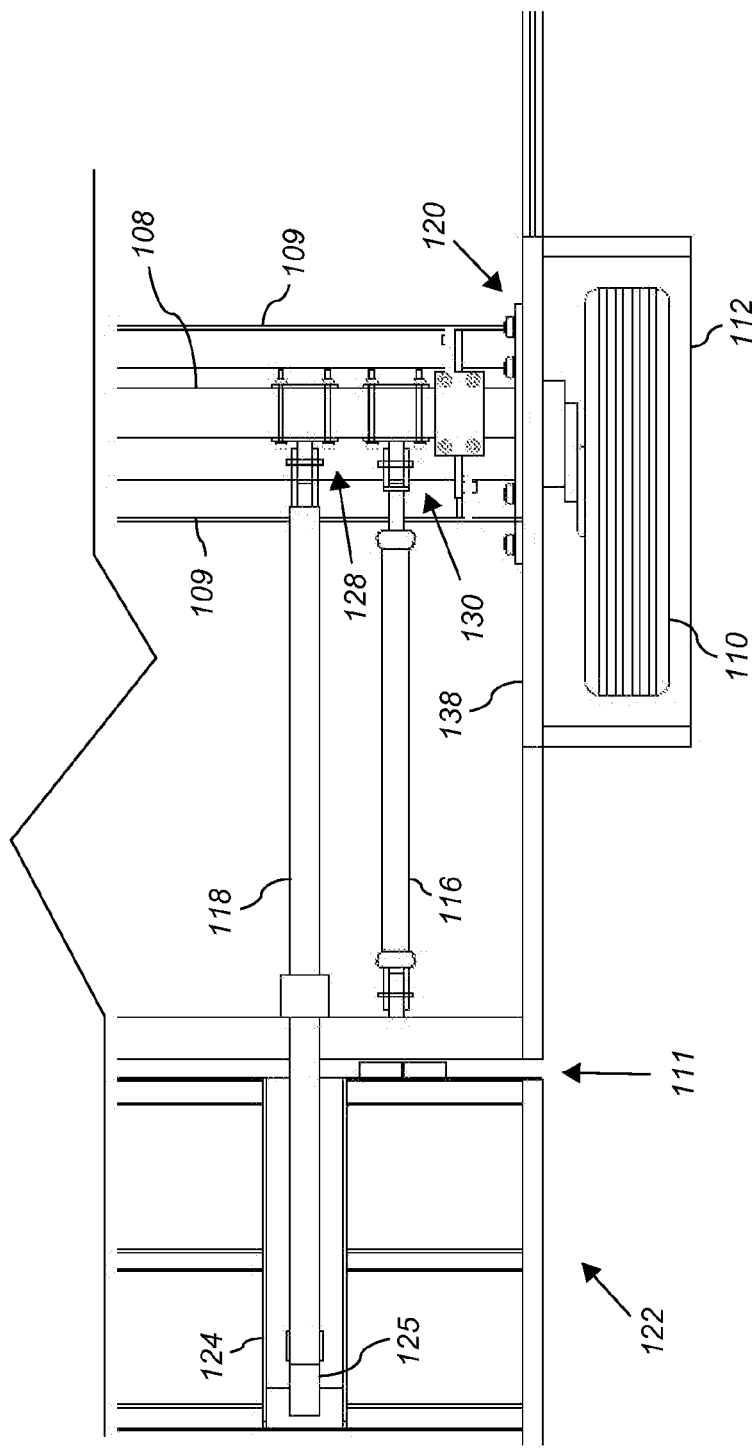
FIG. 13 is a partial bottom plan view of the second embodiment of the present invention in a first, towing position.
Figure 14:
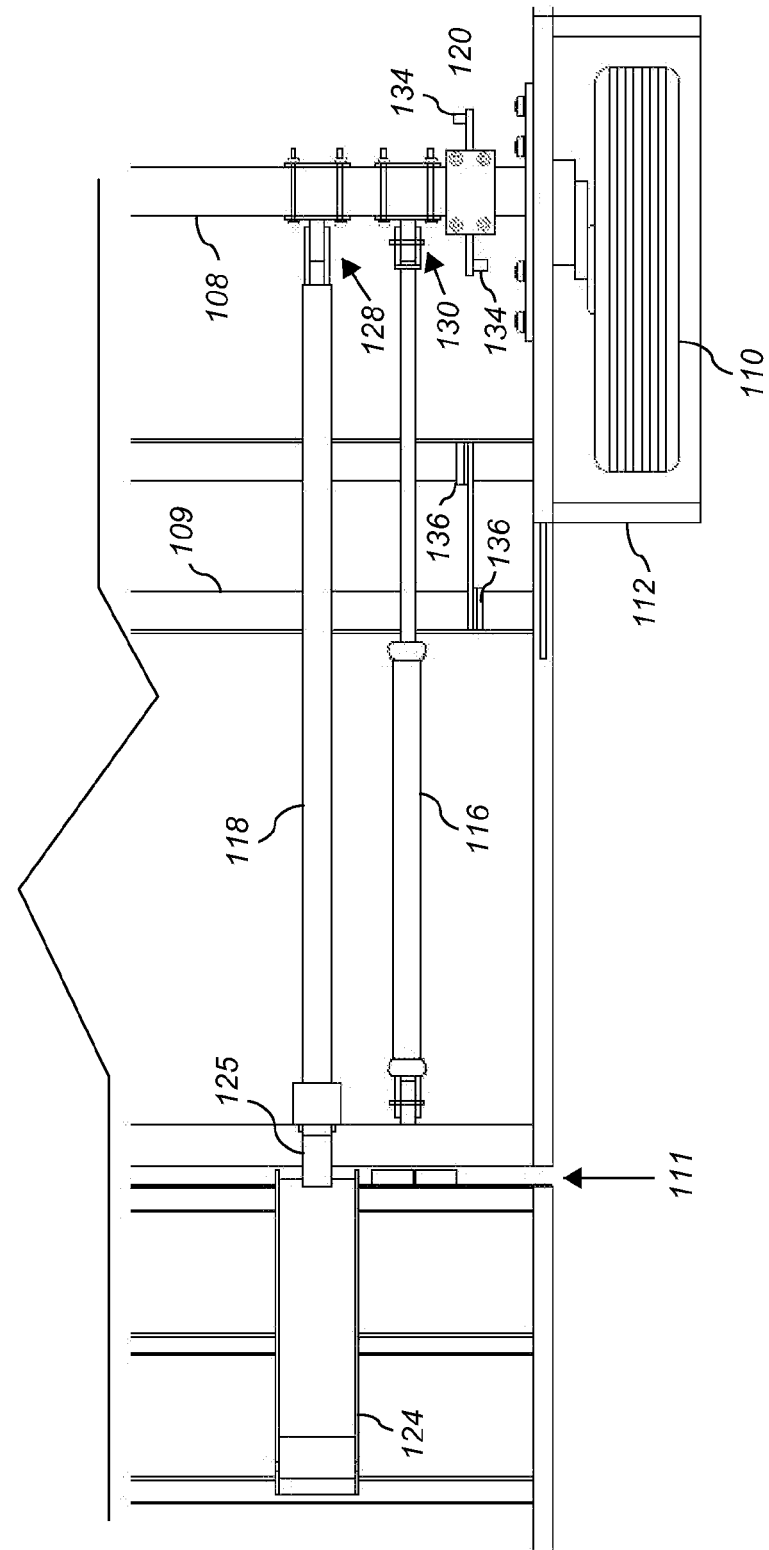
FIG. 14 is a partial bottom plan view of the second embodiment of the present invention in a second, loading position.
Figure 15:
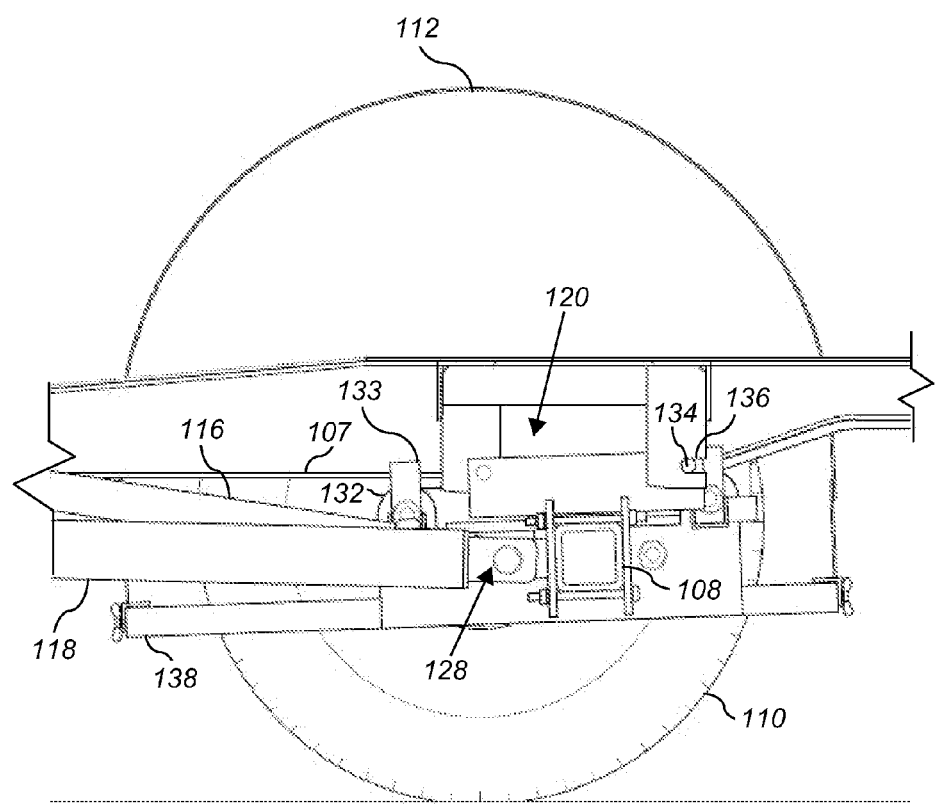
FIG. 15 is a detailed plan view of the second embodiment of the present invention in a first, towing position.
Figure 16:
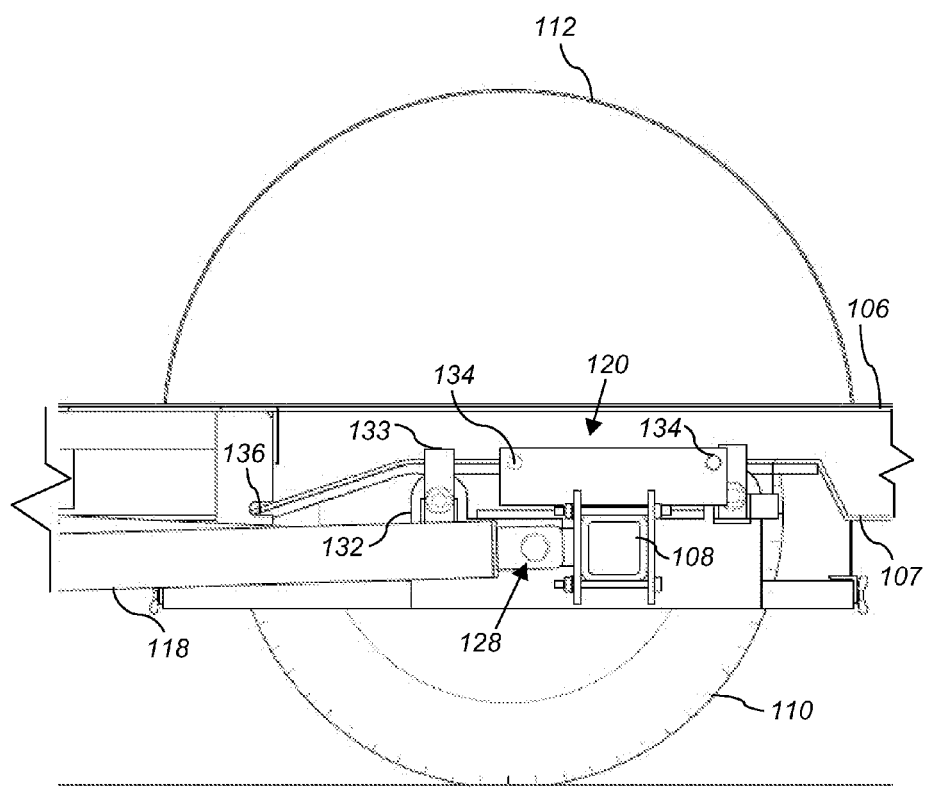
FIG. 16 is a detailed plan view of the second embodiment of the present invention in a second, loading position.

FIGS. 10 and 12 show the trailer in a second, loading position, and show how the dovetail assembly drops, along with the back end of the trailer, as the axle trolley assembly 104 moves toward the front of the trailer and as the carrier arm 118 is drawn away from the dovetail assembly 122. A hanger plate 119 holds the free end of the carrier arm 118 up as it is pulled away from the dovetail assembly.

The hydraulic cylinder assembly 116 moves the entire axle assembly forward and backward. The wheel 110 is offset from the axle via a wheel assembly including the flex-tie axle connector, as shown in more detail in FIGS. 15 and 16 and also in FIGS. 9 and 10. The offset allows the wheel to continue unhindered as the axle assembly 104 moves along the track 107 and into the drop cavity 126, thereby dropping the deck of the trailer 102.

The carrier arm 118 is connected to the axle 108 by a carrier arm mounting assembly 128, and the hydraulic arm 116 is connected to the axle 108 by a similar hydraulic arm mounting assembly 130. These mounting assemblies allow the ends of both the carrier arm 118 and hydraulic arm 116 to pivot as the axle assembly 104 travels along the track 107 and enters the drop cavity 126 of the trailer. Without this pivoting action, the arms may bind, and the carrier arm 118 would not remain parallel with the road, and could cause the dovetail 122 to jerk upwards or downwards uncontrollably.

Figure 11:
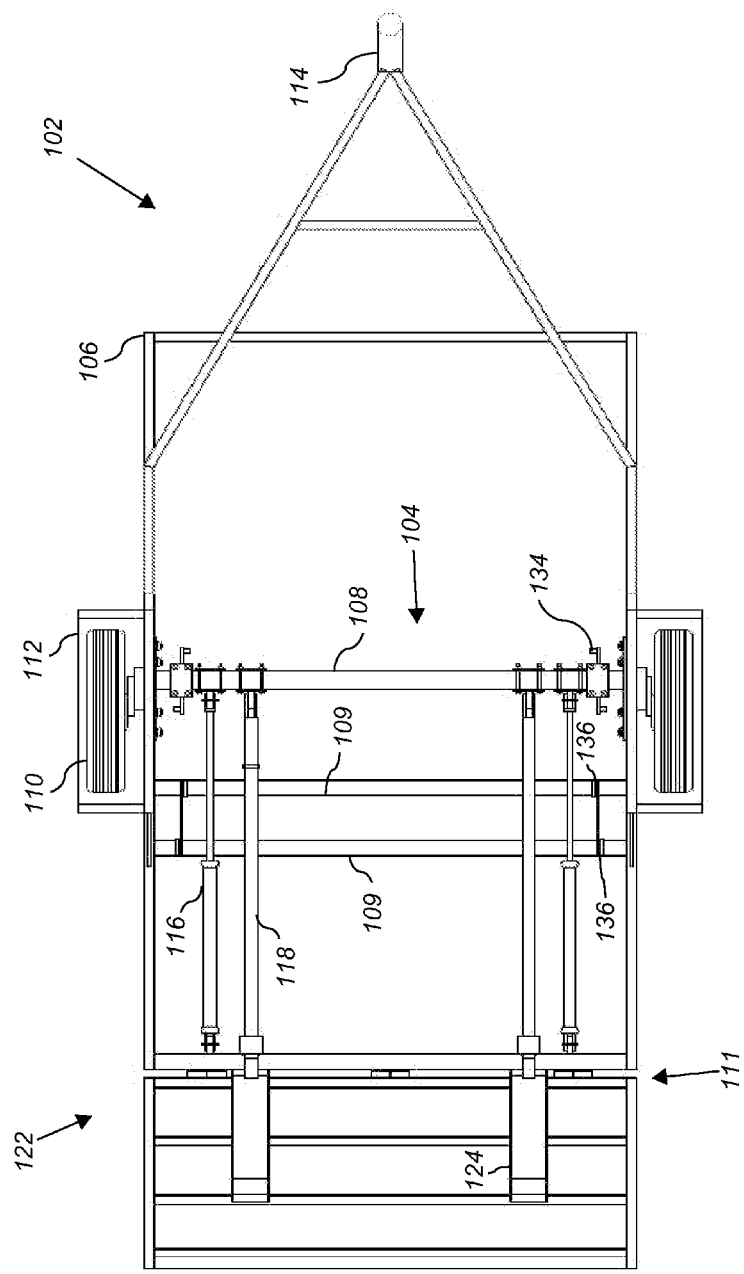
FIG. 11 is a top plan view the second embodiment of the present invention in a second, loading position.

A pair of structural beams 109 are mounted across the frame beneath the axle assembly 104. The locking mechanism including the receiver 136 are welded above these structural beams 109, which receivers 136 receive the locking pins 134 which prevent the assembly 104 from moving backwards toward the dovetail 122 further than the starting position. These locking pins 134 and receivers 136 also keep the axle assembly in place during transport of the trailer 102, preventing the structure from falling. As shown in FIGS. 9 and 11, the axle assembly includes two such locking pins 134 located in proximity to each tire 110 with respective receivers 136 on each side of the trailer 102; however, a single locking pin 134 and receiver 136 could be used on each side.

IV. Third Embodiment Double Axle Trailer System 202

FIGS. 17-24 show a third embodiment of a double axle trailer system 202. Many of the features are similar to the first embodiment trailer system 2 disclosed above. A pair of removable fenders 212 travel along with the axle assembly 204 with their respective tires 210, the fenders being removably connected to a tube 238 welded to the bracket 220 or other element of the axle assembly 204. The fender 212 is mounted to the tube 238 via butterfly nuts or other simple connection elements (e.g. snaps, screws, etc.) which allow the fender to quickly be disconnected from the trailer system 202, expanding the width of the trailer to accommodate larger vehicles.

Like above, the trailer 202 primarily includes a structural frame 206 and a hitch 214 for connecting to a towing vehicle.

A dovetail loading assembly 222 is connected to the rear end of the trailer deck by a hinge as shown in FIGS. 17-22. This dovetail assembly 222 acts as a ramp when the trailer is in the loading position. When in the travel position, the dovetail assembly 222 is held in place by a carrier arm 218 which slides into a slotted receiver 227 on the bottom of the dovetail. The carrier arm holds the dovetail assembly up in a cantilevered fashion in the transport position. The strength of the carrier arm is enough to hold up a portion of a vehicle or other item which is placed directly on the dovetail.

The carrier arm 218 is mounted to the undercarriage of the trailer and is powered by a hydraulic arm 216. When the trailer transforms from the travel position to the loading position, the entire rear axle 208 trolley assembly 204, including the mounted end of the carrier arm 228, moves towards the front of the trailer. The axle 208 trolley assembly 204 follows a track 207 which moves the assembly towards the front of the trailer but also upwards into a drop cavity 226, causing the rear end of the trailer to drop during the process. This accelerates the transformation from a transport position to a loading position while decreasing the slope of the dovetail ramp when deployed.

Figure 17:
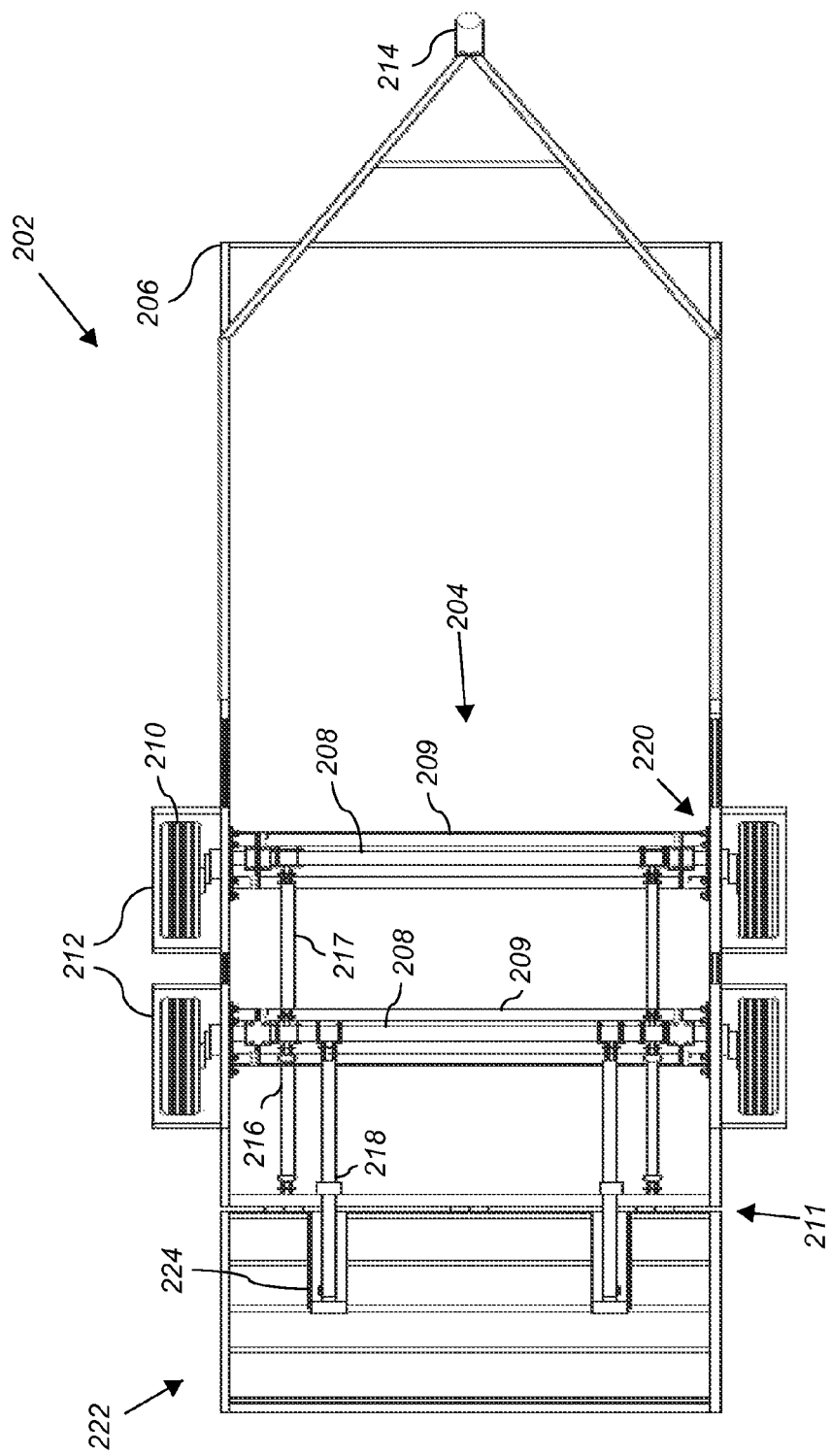
FIG. 17 is top plan view of a third embodiment of the present invention in a first, towing position.
Figure 18:
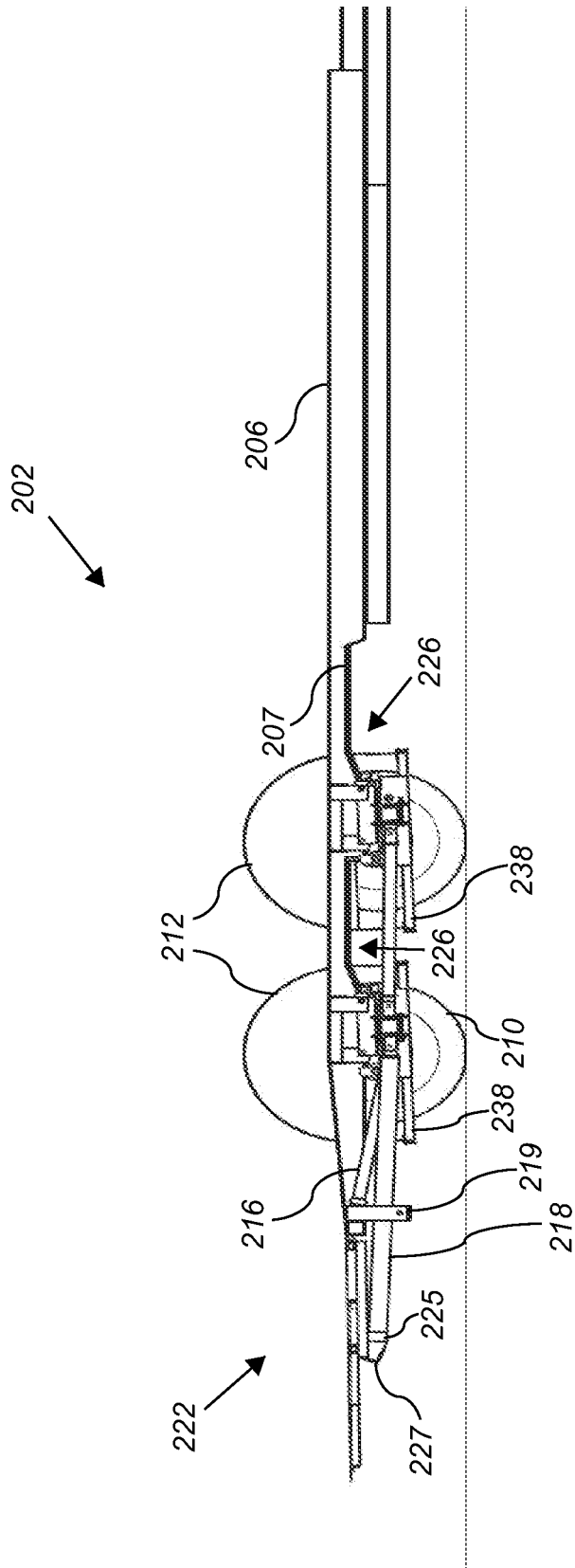
FIG. 18 is a side elevational view thereof.

As shown in FIG. 17, in a preferred embodiment there is a break 211 in the deck slope near the rear end of the trailer deck. This is also to aid in the loading process by providing a better slope for tires to travel up. As shown in FIG. 18, the free end of the carrier arm 218 includes a slanted edge on its end 225 which slots into a catch 227 shown in FIG. 18, within the slotted receiver 224 of the dovetail assembly 222 for a more secure connection. The catch is mounted to the underside of the trailer deck which catches the axle trolley assembly when the trailer is placed into a transport position. This catch locks the trolley assembly in place and prevents the axle from moving during transport.

The axle trolley assembly 204 includes a bracket 220 which connects to the wheel axle. The trolley assembly also includes a guide clip 233 for guiding the assembly along the track when the assembly is in motion. The guide clip 233 may also act as a backup safety element if the rollers 232 come off of the track 207. A flex-tie or other connection element permits axle rotation of the wheel axle with approximately the same center line elevation as a typical wheel axle.

Figure 20:
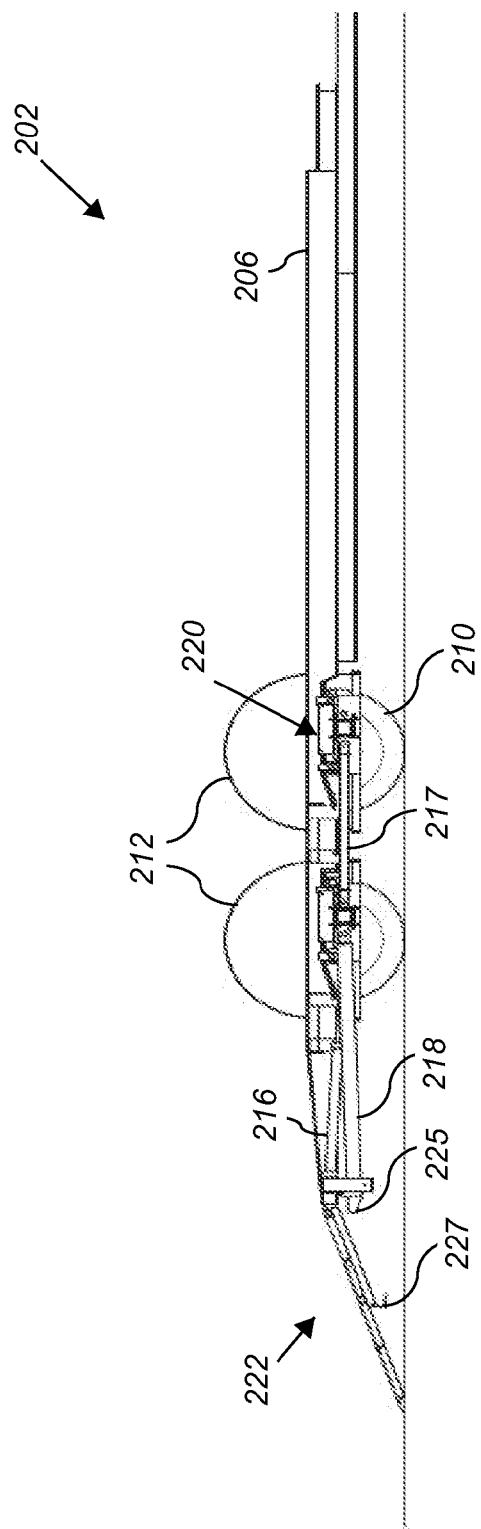
FIG. 20 is a side elevational view thereof.
Figure 21:
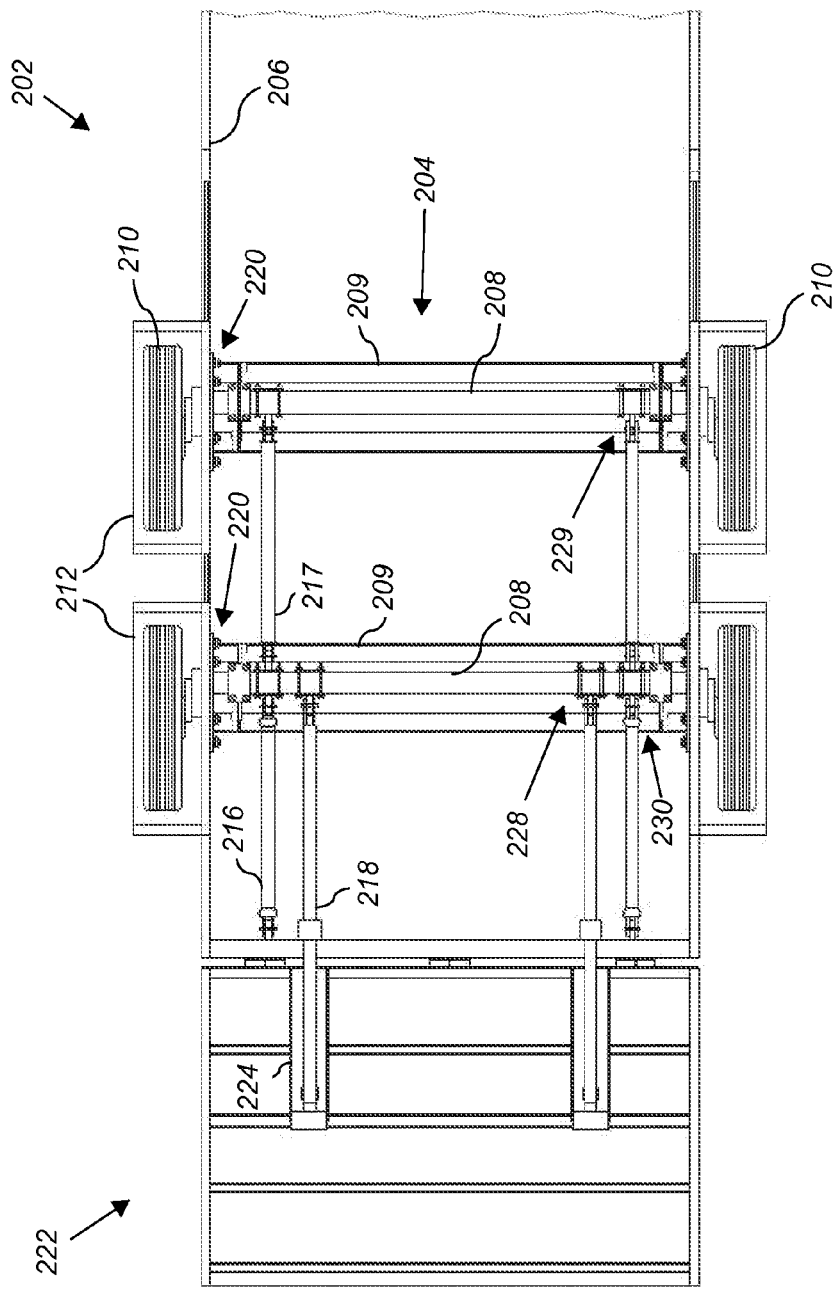
FIG. 21 is a partial bottom plan view of the third embodiment of the present invention in a first, towing position.
Figure 22:
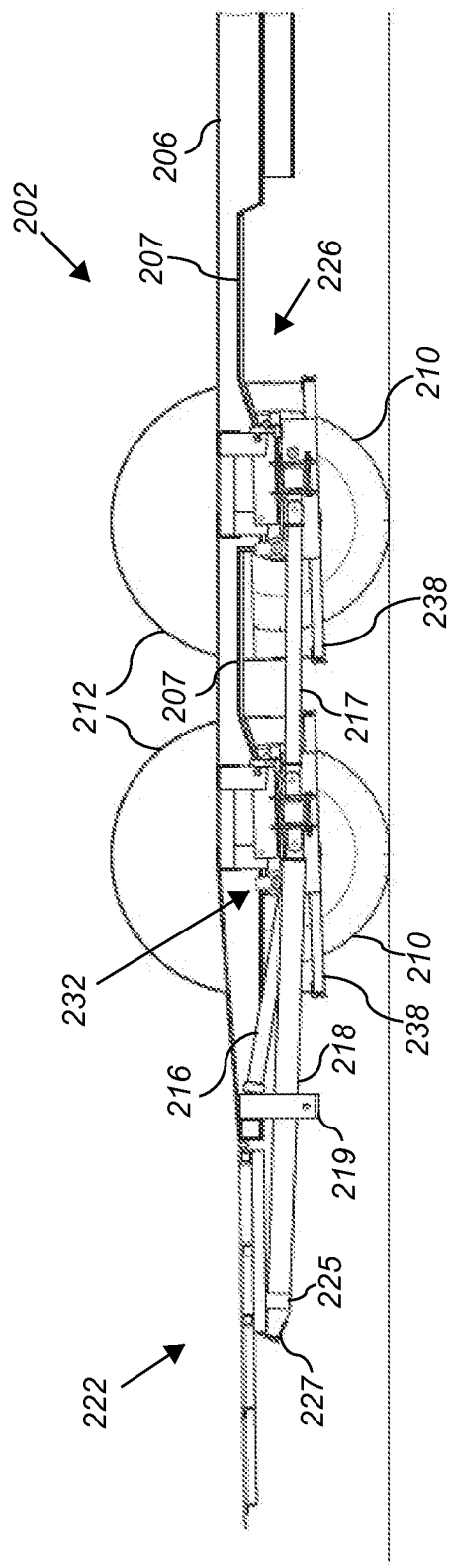
FIG. 22 is a partial side elevational view thereof.
Figure 23:
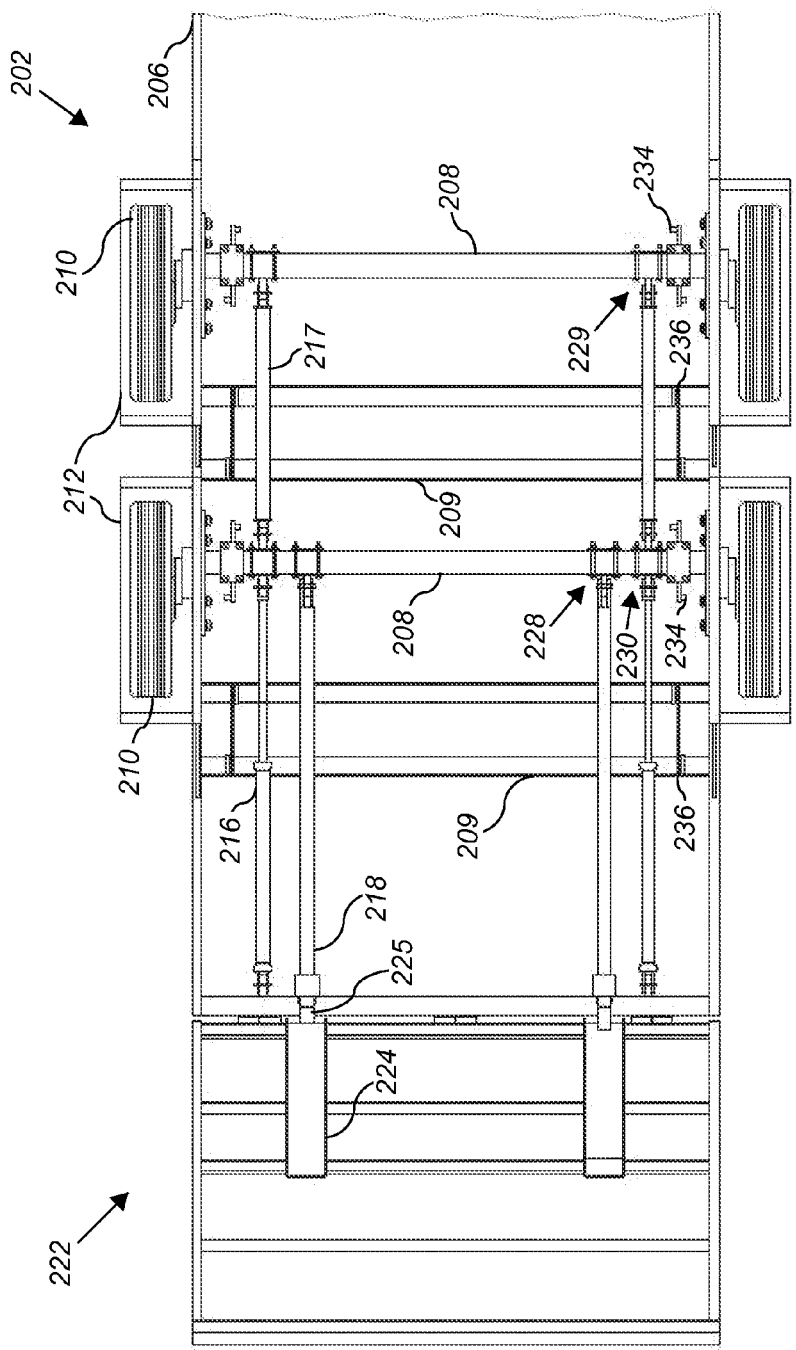
FIG. 23 is a partial bottom plan view of the third embodiment of the present invention in a second, loading position.
Figure 24:
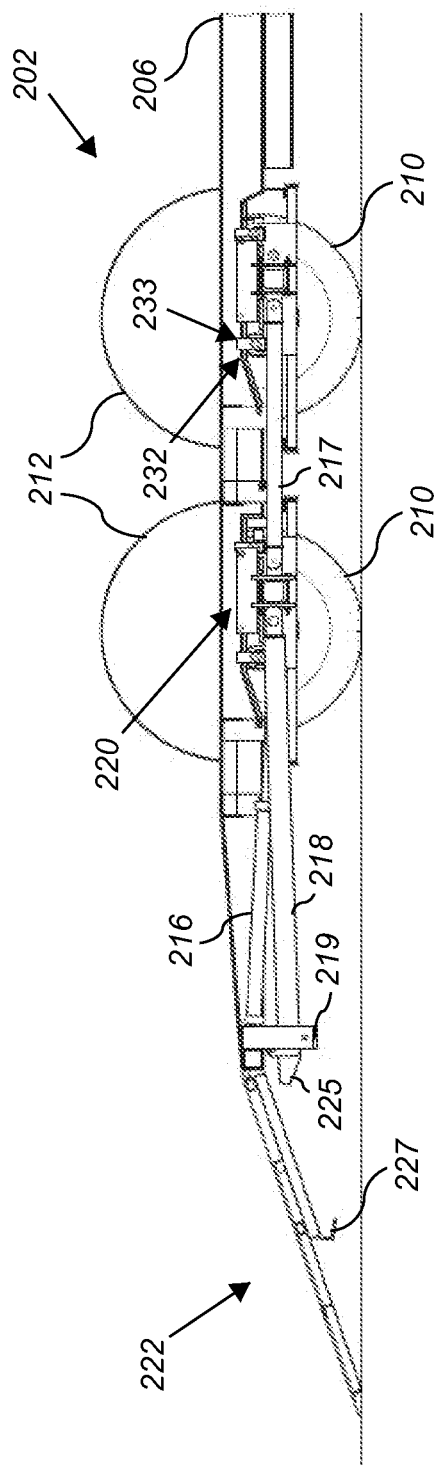
FIG. 24 is a partial side elevational view thereof.

FIGS. 18 and 20 show the trailer in a second, loading position, and show how the dovetail assembly drops, along with the back end of the trailer, as the axle trolley assembly 204 moves toward the front of the trailer and as the carrier arm 218 is drawn away from the dovetail assembly 222. A hanger plate 219 holds the free end of the carrier arm 218 up as it is pulled away from the dovetail assembly.

The hydraulic cylinder assembly 216 moves the entire axle assembly forward and backward. The wheel 210 is offset from the axle via a wheel assembly including the flex-tie axle connector, as shown in more detail in FIGS. 23 and 24 and also in FIGS. 17 and 18. The offset allows the wheel to continue unhindered as the axle assembly 204 moves along the track 207 and into the drop cavity 226, thereby dropping the deck of the trailer 202.

The carrier arm 218 is connected to the axle 208 by a carrier arm mounting assembly 228, and the hydraulic arm 216 is connected to the axle 208 by a similar hydraulic arm mounting assembly 230. These mounting assemblies allow the ends of both the carrier arm 218 and hydraulic arm 216 to pivot as the axle assembly 204 travels along the track 207 and enters the drop cavity 226 of the trailer.

Figure 19:
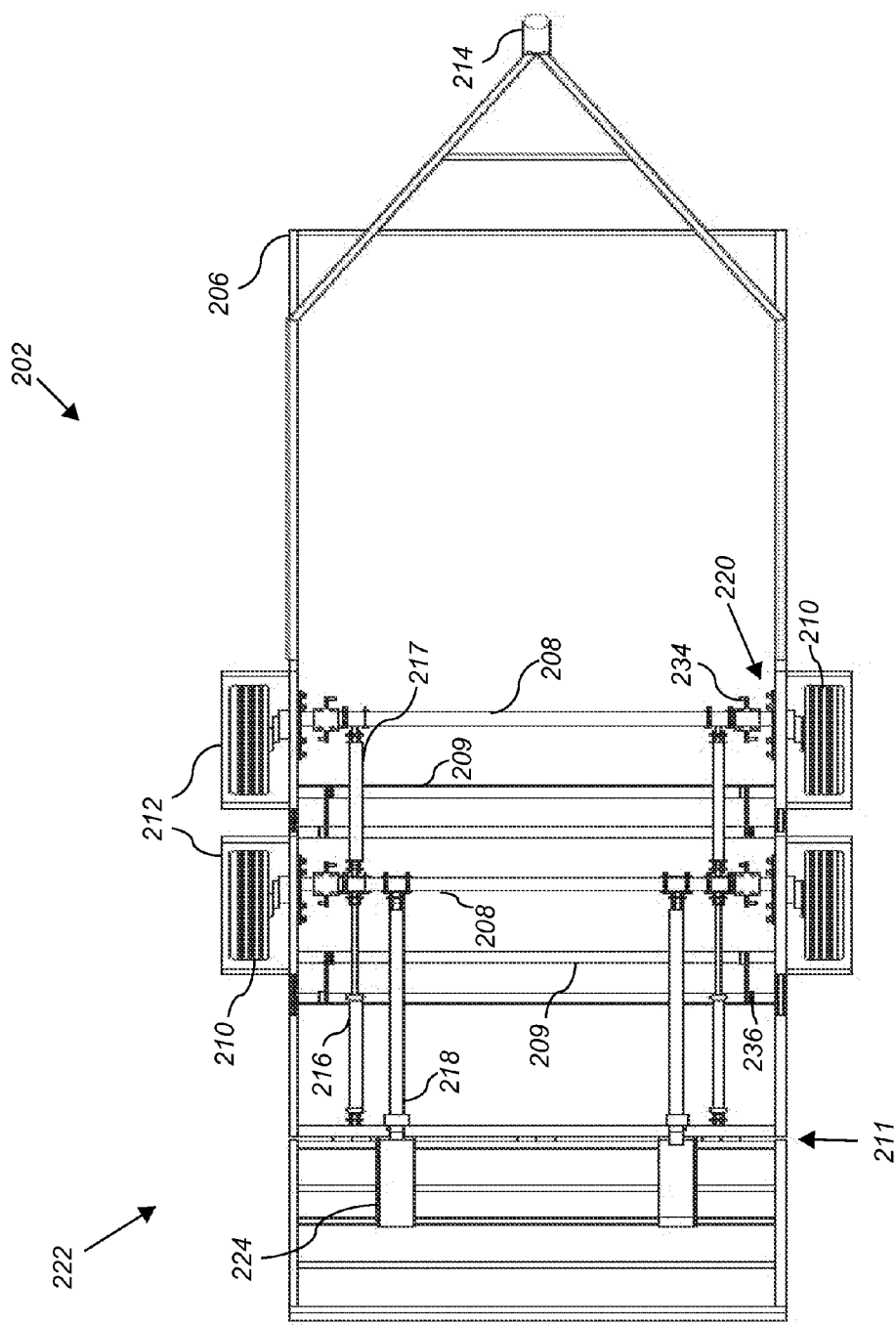
FIG. 19 is a top plan view the third embodiment of the present invention in a second, loading position.

A pair of structural beams 209 are mounted across the frame beneath each axle 208 the axle assembly 204. The locking mechanism including the receiver 236 are welded above these structural beams 209, which receivers 236 receive the locking pins 234 which prevent the assembly 104 from moving backwards toward the dovetail 222 further than the starting position. These locking pins 234 and receivers 236 also keep the axle assembly in place during transport of the trailer 202, preventing the structure from falling. As shown in FIGS. 17 and 19, the axle assembly includes two such locking pins 234 located in proximity to each tire 210 with respective receivers 236 on each side of the trailer 202; however, a single locking pin 234 and receiver 236 could be used on each side.

Because this embodiment includes two axles 208, the axles must be joined by structural arms 217 which keep the axles 208 and respective tires 210 spaced appropriately while the assembly 204 moves forwards or backwards. The structural arms 217 transfer the force from the hydraulic arm 216 applied against the rear axle to the front axle at the same rate. The ends of the structural arms 217 must pivot against the two axles 208 similar to the hydraulic arm mounting assembly 230 and the carrier arm mounting assembly 228, therefore a structural arm mounting assembly 229 is affixed to each end of each structural arm 217, connecting each end to each respective axle. This allows the arms 217 to maintain the proper spacing between the axles as the assemblies 204 follow the track 207 into the drop cavity 226.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A trailer comprising:
a frame including a front end, a rear end, two sides, a load platform, and a drop cavity located along each of said two sides;
a dovetail platform hingedly affixed to the rear end of said frame;
an axle assembly including an axle having two ends and a mounting bracket affixed at each of said two ends, each said mounting bracket including at least one roller engaging a track affixed to said frame including along said drop cavity;
at least one hydraulic arm having a proximal end and a distal end, said hydraulic arm proximal end affixed to said frame in proximity to said rear end, said hydraulic arm distal end including a hydraulic mount affixed to said axle such that it pivots about said axle;
at least one carrier arm having a proximal end and a distal end, said carrier arm distal end including a carrier arm mount affixed to said axle such that it pivots about said axle, and said carrier arm proximal end configured to insert into a receiver located on said dovetail platform;
wherein said hydraulic arm is configured to move said axle assembly along said track, whereby said carrier arm is configured to be withdrawn from said receiver located on said dovetail platform, and whereby said dovetail platform is configured to pivot downward as said carrier arm is withdrawn; and
said trailer is configured to transform from a first, transport configuration into a second, loading configuration.

2. The trailer of claim 1, further comprising:
a pair of removable fenders, each of said removable fenders removably affixed to a respective mounting tube affixed to a respective mounting bracket; and
wherein said removable fenders are configured to travel along said track with said axle assembly.

3. The trailer of claim 2, wherein said removable fenders are affixed to said mounting tubes via wing nuts.

4. The trailer of claim 1, wherein each said roller comprises a wire rope roller sheave.

5. The trailer of claim 1, further comprising a hanger plate affixed in proximity to said rear end of said frame, said hanger plate configured to support said carrier arm.

6. A trailer comprising:
a frame including a front end, a rear end, two sides, a load platform, and a drop cavity located along each of said two sides;
a dovetail platform hingedly affixed to the rear end of said frame;
an axle assembly including a first axle and a second axle, each axle having two ends and a mounting bracket affixed at each of said two ends, each said mounting bracket including at least one roller engaging a track affixed to said frame including along said drop cavity;
at least one hydraulic arm having a proximal end and a distal end, said hydraulic arm proximal end affixed to said frame in proximity to said rear end, said hydraulic arm distal end including a hydraulic mount affixed to said first axle such that it pivots about said first axle;
at least one carrier arm having a proximal end and a distal end, said carrier arm distal end including a carrier arm mount affixed to said first axle such that it pivots about said first axle, and said carrier arm proximal end configured to insert into a receiver located on said dovetail platform;
at least one structural arm having a proximal end and a distal end, said structural arm including a first structural arm mount affixed to said proximal end and a second carrier arm mount affixed to said distal end, said first structural arm mount affixed to said first axle such that it pivots about said first axle, and said second structural arm mount affixed to said second axle such that it pivots about said second axle;
wherein said hydraulic arm is configured to move said axle assembly along said track, whereby said carrier arm is configured to be withdrawn from said receiver located on said dovetail platform, and whereby said dovetail platform is configured to pivot downward as said carrier arm is withdrawn; and
said trailer is configured to transform from a first, transport configuration into a second, loading configuration.

7. The trailer of claim 6, further comprising:
four removable fenders, each of said removable fenders removably affixed to a respective mounting tube affixed to a respective mounting bracket; and
wherein said removable fenders are configured to travel along said track with said axle assembly.

8. The trailer of claim 7, wherein said removable fenders are affixed to said mounting tubes via wing nuts.

9. The trailer of claim 6, wherein each said roller comprises a wire rope roller sheave.

10. The trailer of claim 6, further comprising a hanger plate affixed in proximity to said rear end of said frame, said hanger plate configured to support said carrier arm.

* * * * *